United States Patent
Laquerbe

(10) Patent No.: US 7,151,977 B2
(45) Date of Patent: Dec. 19, 2006

(54) METHOD FOR MEASURING WITH A MACHINING MACHINE-TOOL, TOOL ADAPTED THEREFOR AND SOFTWARE PRODUCT MANAGING SAME

(75) Inventor: Jean-Marc Laquerbe, Castres (FR)

(73) Assignee: Comau Systemes France, Trappes Cedex (FR)

( * ) Notice: Subject to any disclaimer, the term of this patent is extended or adjusted under 35 U.S.C. 154(b) by 0 days.

(21) Appl. No.: 10/535,891

(22) PCT Filed: Nov. 20, 2003

(86) PCT No.: PCT/FR03/03434

§ 371 (c)(1),
(2), (4) Date: Jan. 30, 2006

(87) PCT Pub. No.: WO2004/048030

PCT Pub. Date: Jun. 10, 2004

(65) Prior Publication Data

US 2006/0129267 A1    Jun. 15, 2006

(30) Foreign Application Priority Data

Nov. 22, 2002    (FR) .................................. 02 14616

(51) Int. Cl.
*G06F 19/00*    (2006.01)
(52) U.S. Cl. .................................... 700/174
(58) Field of Classification Search ........ 700/108–110, 700/170, 173–175, 193
See application file for complete search history.

(56) References Cited

U.S. PATENT DOCUMENTS

| | | | |
|---|---|---|---|
| 4,078,868 A | | 3/1978 | Erkfitz |
| 4,704,825 A | | 11/1987 | Moore |
| 5,272,818 A | * | 12/1993 | Youden et al. ................. 33/640 |
| 5,303,458 A | * | 4/1994 | Sheehan et al. ............... 29/405 |
| 5,329,457 A | | 7/1994 | Hemmerle et al. |
| 5,718,617 A | * | 2/1998 | Priestley et al. .............. 451/14 |
| 5,941,117 A | * | 8/1999 | Butcher et al. ............ 72/342.7 |
| 6,409,573 B1 | | 6/2002 | Mukai et al. |
| 6,539,274 B1 | * | 3/2003 | Rauth et al. ................. 700/159 |
| 7,090,561 B1 | * | 8/2006 | Cambridge et al. ............ 451/5 |

* cited by examiner

*Primary Examiner*—Maria N. Von Buhr
(74) *Attorney, Agent, or Firm*—Akerman Senterfitt; Stephen Pendorf; Peter A. Chiabotti

(57) ABSTRACT

The invention concerns a measuring method applicable to a machine-tool (M) which consists in causing the tool (O) to contact a point selected as reference in the machining station by controlling said actuating means (200) which, through exceeding a force value defined as threshold, triggers the measurement so as to find out the value of the stroke performed and in repeating the operation to compare the values and to correct the values during the performance of the machining process. The invention also concerns the tool for implementing the method and the software product controlling same. The invention facilitates measurement on a machining station, integration of expansion phenomena, and measurement of the workpiece for the purpose of orientation.

11 Claims, 7 Drawing Sheets

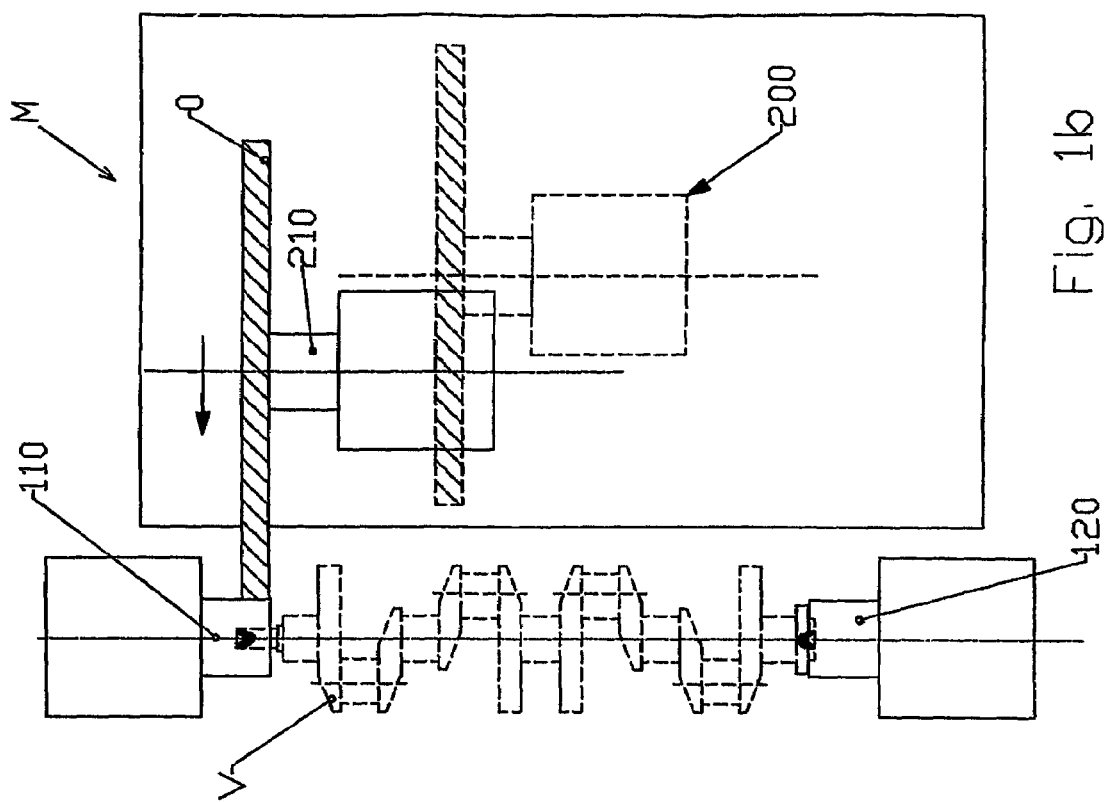
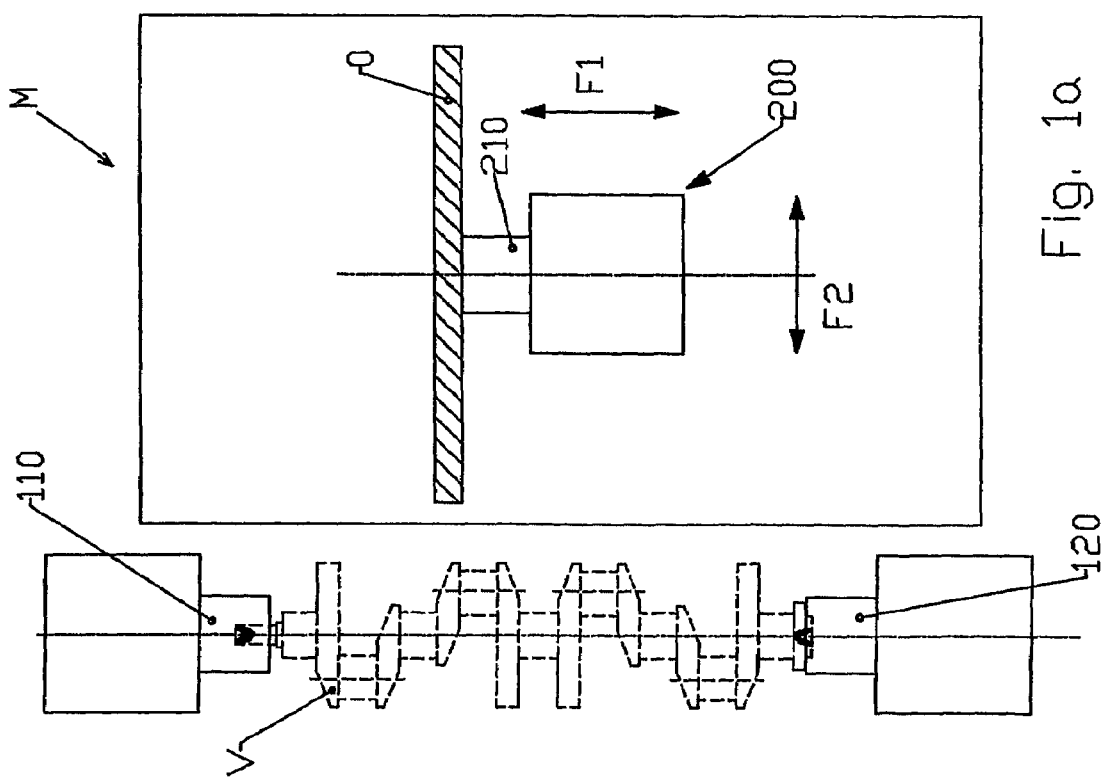

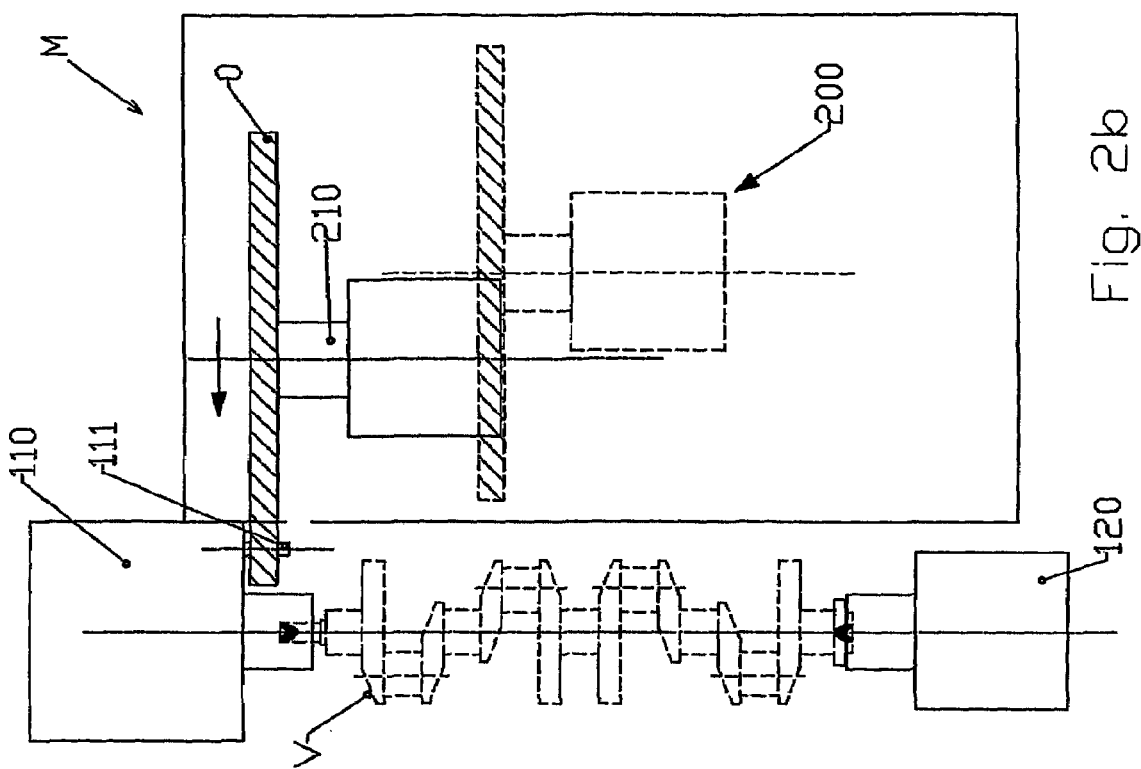
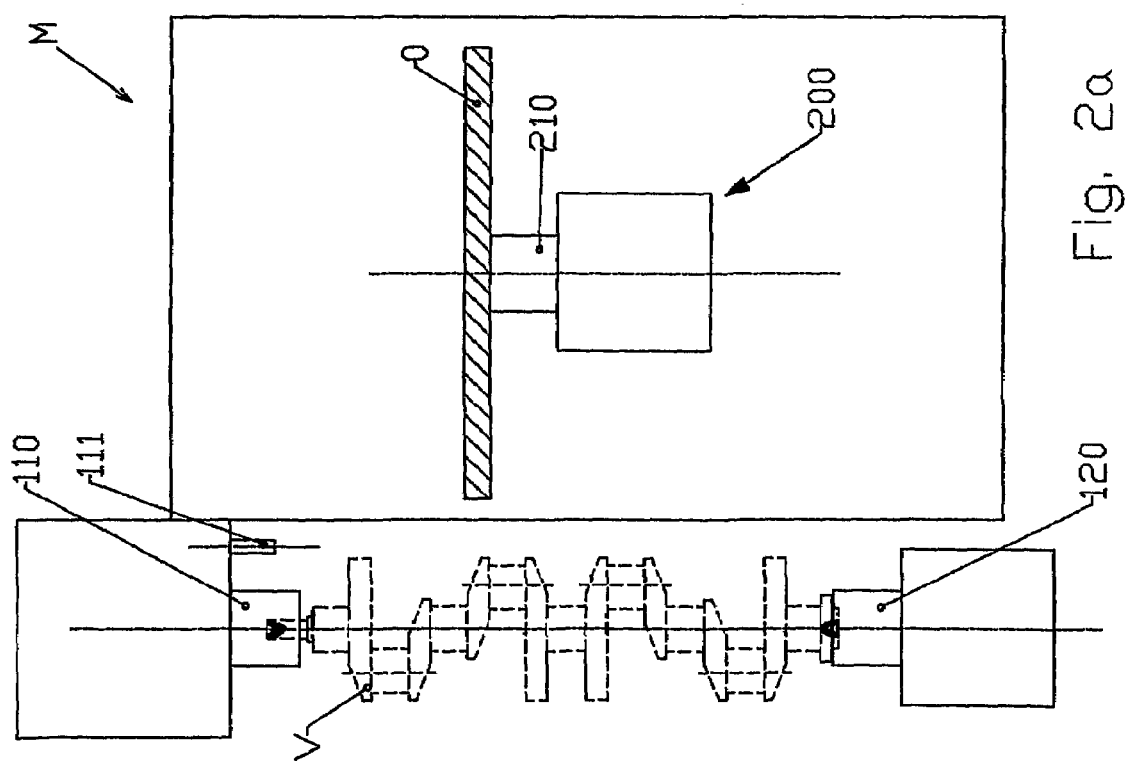

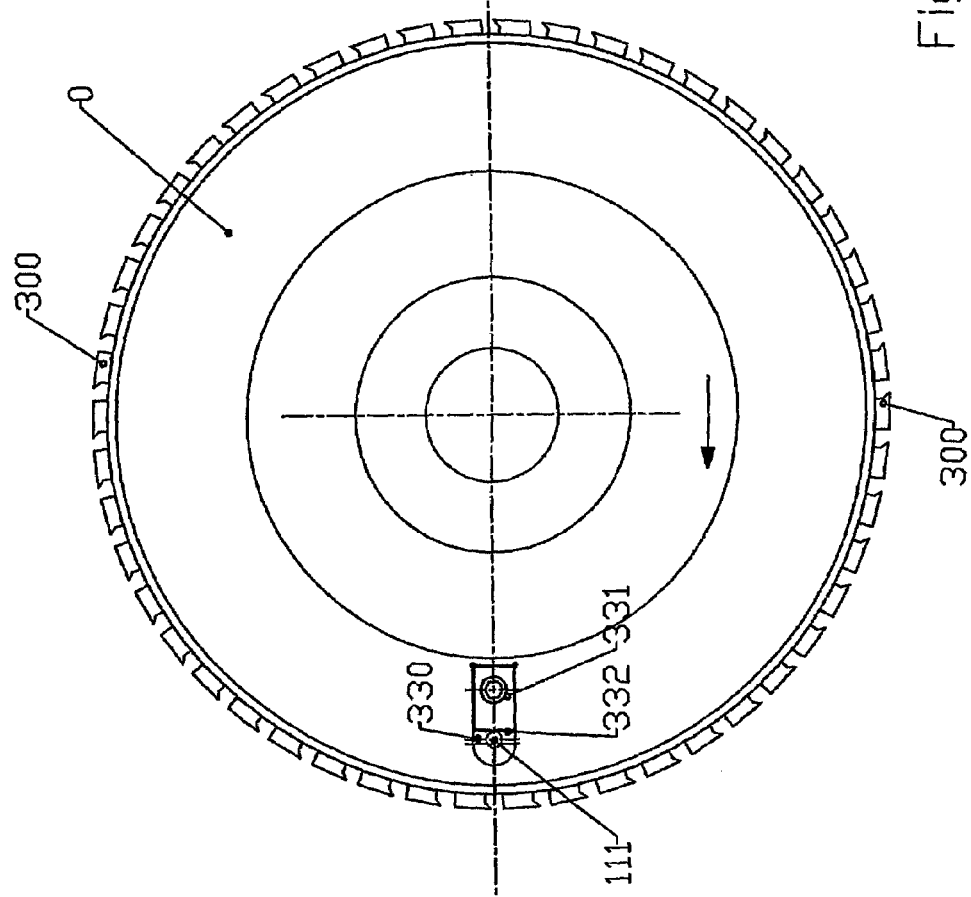

METHOD FOR MEASURING WITH A MACHINING MACHINE-TOOL, TOOL ADAPTED THEREFOR AND SOFTWARE PRODUCT MANAGING SAME

This application is a national stage of PCT/FR2003/003434 filed Nov. 20, 2003 and is based upon French Patent Application No. 02/14616, filed Nov. 22, 2002 under the International Convention.

APPLICATION FIELD OF THE INVENTION

This invention relates to the machining field and particularly to means for measuring on machined parts and parts to be machined, and taking account of the expansion of functional subassemblies participating in machining process to achieve an optimised machining quality.

DESCRIPTION OF PRIOR ART

The applicant has observed that functional subsystems such as cutting inserts, tool holder disks, reduction gears placed between the tool and the motor, etc. participating in a machining process, and particularly for the machining of crankshafts, are subject to au expansion phenomenon due to the progressive increase in temperature during the machining process within the said subassemblies.

One particular consequence of this expansion is that machining in which the said subassemblies participate becomes imprecise.

Obviously, this expansion phenomenon could be calculated theoretically so as to predict variations in tolerances during operation of the machine-tool, but this calculation based on an initial assumption when the tool and the machine-tool are "cold" does not easily take account of transient phases, for example during a tool change, the tool then being "cold" while the drive means will be hot.

Therefore it is difficult to assure that correct dimensions are respected, particularly because required precision criteria on machining to be done are becoming increasingly strict, particularly for crankshafts.

At the moment, measurements of the imprecision of machining are conventionally made "a posteriori", in other words after the machining has been done and after a fault has been detected on the part, and an automatic or manual modification is made on the said functional subassemblies, for example on the stroke applied by the actuating means plunging the tool or the tool holder disk towards the part to correct the tool. It is easily understandable that although the correction will improve the machining, such an "a posteriori" measurement after the part has been made cannot provide an optimum solution during the said transient phases.

Furthermore, a measurement of the expansion of functional subassemblies participating in machining starting from machined parts depends on dimensional contingencies of unfinished parts and possible part gripping defects.

This expansion phenomenon, due to the increase in temperature becomes a problem that is increasingly important to solve, to the extent that machining solutions are now tending towards dry machining to avoid the need for retreatment of sprayed liquids, in other words towards a machining process in which no cutting and/or cooling liquids are used at the machining station.

Similarly, the versatility of machine-tools causes an increase in the number of tool change phases, also increasing the number of transient phases.

Tools such as the tool holder disk described in American document No. U.S. Pat. No. 4,078,868 exist in prior art, that holds cutting inserts around its periphery, and in which the position of the cutting inserts can be adjusted. Nevertheless, the adjustment of the position of the cutting inserts is a long and tedious operation. Furthermore, such an adjustment must be carried out taking account of parameters such as expansion, that are difficult to take account of as explained above.

To achieve this, prior art includes part measurement means that can be used in the machining station itself for specific applications. Thus, for example, there are electronic devices called "feelers" that replace the tool on a tool holder slide and that measure the dimensions of a part by making a sequence of contacts. Once the feeler has detected the contact, the feeler sends a signal to the numerical control controlling the movement of the slide and therefore the feeler, the numerical control stops the movement and takes a measurement of the movement made on the measurement rule conventionally associated with the actuating means of a machining machine-tool with numerical axes. This solution has the disadvantage that it requires the presence of a particularly expensive electronic device and it necessitates a tool change phase, which has the consequences of causing a pause in the manufacturing phase.

Methods also exist like that described in American patent No. U.S. Pat. No. 4,704,825 that proposes to ensure an optimum size of a shape made by a tool capable of moving not only along the conventional X, Y and Z axes, but also along a U axis so as to offer an orbital type machining. To achieve this, the method proposes to make the tool, when stopped, move along the U axis until it comes in contact with a sensor with a reference positioning surface, the stroke between the start position and the reference surface corresponding to the radius of the finished reaming to be made by orbital machining. The tool holder spindle mobile in translation along the X, Y and Z axes with the tool centred on the centre line of the spindle, is placed in a first position relative to the detector reproducing the radius of the finished reaming to be made by orbital machining, between the centre line of the spindle and the reference surface of the sensor. The tool that is mobile in translation along the U axis only then moves into a second position, which is stopped when the cutting surface of the milling tool comes into contact with the reference surface of the sensor.

Prior art also includes means of measuring the torque or the force exerted inside an actuating means, and actuating means fitted with these measurement means.

DESCRIPTION OF THE INVENTION

Starting from this existing state, the applicant carried out research to find an alternative to the feeler to ensure measurement on the parts.

Similarly, another purpose of the invention is the design of a machining method that can better take account of the expansion phenomenon.

This research led to the design of a measuring method by a particularly judicious machine-tool to avoid the presence of a feeler or an additional detection means that was previously necessary, for measuring on a part present in the machining area.

The measuring method according to the invention is applicable to a machine-tool comprising a machining station in which at least one tool or tool holder disk is moved relative to at least one part to be machined, the relative displacement of the tool with respect to the part being controlled by at least one actuating means for which the position and stroke are controlled and known, the actuating means being fitted with a means of detection of the force produced by the said actuating means.

According to the invention, this method is remarkable in that it consists of making the tool or the tool holder disk come into contact with a point chosen as a reference in the machining station by controlling the said actuating means which, through exceeding a force value previously defined as a threshold, triggers the measurement so as to know the value of the stroke performed and in repeating the operation to compare the recorded values and to correct the strokes during the required machining process itself.

This characteristic is particularly advantageous in that it makes it possible to make a measurement directly by contact without necessitating the presence of a feeler. This characteristic can be equally applicable to a mobile tool holder slide or to a mobile part holder device with a slide or fixed tool holder electric spindle.

The use of a threshold for the force during the contact made by the actuating means avoids the need for an additional electronic device to start measurement. In fact, the measurement of the force or of the torque for an actuating means implementing a rotation movement applied by an actuating means is a conventional function in means of controlling movements of a machine-tool. The invention proposes a new use of this function to achieve a particularly advantageous objective, both technically and in terms of investment. For example, the possibility of avoiding the presence of a feeler, eliminates the cost of the feeler from the price of a machine-tool.

Thus, unlike the description in American document No. U.S. Pat. No. 4,704,825, the measurement is not triggered by the reference point acting as a sensor, and instead it is triggered when a threshold value of the forces applied by the actuating means when this actuating means stops in contact with the said point is exceeded. Therefore neither the point nor the reference surface are included in the invention, either through a sensor or any type of detection means.

Similarly, if the measurement is done using the tool, the tool change and the corresponding waiting phase are no longer necessary.

The use of this function as a means of triggering a measurement is particularly innovative, since this function is conventionally used for example to measure overspeeds during machining phases and never to act as a contact sensor with a stop to measure the stroke of the subassembly used by the actuating means on which it is installed.

The applicant proposes to use this new method to make comparative measurements directly on the part to be machined or the machined part. In fact, according to one particularly advantageous characteristic of the invention, the method consists of making the tool or the tool holder disk come into contact with the part to be machined when stopped, so as to find out the value of the stroke performed and in repeating the operation to compare the recorded values and to correct the strokes and orientations during the machining process to be carried out itself.

Research carried out by the applicant on this basis led to the design of a particularly judicious variant to the measuring method according to the invention to take account of the expansion phenomenon due to heat produced by the machining phases of a machine-tool.

According to the invention, the method is remarkable in that it consists of making the tool or the tool holder disk, when stopped, come into contact with a point chosen as being a reference on the machine-tool by controlling the said actuating means so as to find out the value of the stroke performed and in repeating the operation to compare the recorded values and to correct the strokes during the machining process to be done itself.

This method is remarkable in that it makes it possible to use an element of the machine-tool inside the machining station, for which the position is not sensitive or is less sensitive to the expansion phenomenon. It makes it possible to include measurements between the contact of the tool and the actuating means enabling this contact, within the measured dimension chain, in other words the functional subassemblies most directly concerned by the expansion phenomenon, such as the tool holder disk and the movement control and reduction gear assembly rotating the tool. Obviously, the dimension related to the tool or the tool holder disk that forms one of the subassemblies most affected by the expansion phenomenon is included within this measured dimension chain.

Furthermore, the measurement is no longer made on the machined part with the uncertainties and disadvantages mentioned above inherent to such a control, but directly on the functional subassemblies participating in the machining process which is particularly useful considering when dealing with the expansion phenomenon.

Similarly, a check of the dimensions could be made following any event that could modify them, such as a tool change before the first part is made.

Therefore according to this characteristic of the method according to the invention, at any given time the machine-tool operates like a feeler, except that the difference in values between the different strokes made by the mobile head formed by the tool are not used for a measurement of the felt object, but rather for measuring functional subassemblies including the tool participating in moving the feeler by comparing the lengths of strokes over the same path, the difference being caused by expansion of the said subassemblies. The use of the tool itself as a feeler is particularly innovative.

According to the invention, a reference measurement is made starting from so-called "basic data" for example at the beginning of a machining cycle during which the tool and its drive means are cold and therefore not expanded. The method then consists of taking measurements regularly or taking measurements at specific moments during the machining process, so as to take account of variations due to expansion and to ensure that corrections are taken into account directly, particularly in the tool drive means.

It becomes possible to take this measurement due to the function described above integrated into the actuating means that consists of measuring the torque or the force developed. Thus, the method according to the invention adapted to a machine-tool in which the means of moving the tool or the tool holder disk towards the part is fitted with a means of detecting the force produced, consists particularly of setting up a force trigger threshold for the actuating means of the tool towards the part, during the measuring phase, such that the stroke is measured as soon as the stop has stopped the plunge feed movement and the threshold has been exceeded.

Another purpose of the invention is to provide a tool or a tool holder disk particularly suitable for use with the method according to the invention. Although a standard tool or tool holder disk can fulfill this function, the applicant considered a modification to a machining tool or tool holder disk for some applications that will improve the measurement function of this tool.

The invention also relates to a software product for managing the measuring method, remarkable in that it consists of memorising measurements made at the beginning of the method and triggered by the actuating means to make comparisons of subsequent measurements with memorised measurements, and consequently to correct strokes and orientations of parts or tools.

Now that the fundamental concepts of the invention have been described, other characteristics and advantages of embodiments of the method and the tool according to the invention will become clearer after reading the following description with reference to the appended drawings.

BRIEF DESCRIPTION OF THE DRAWINGS

FIG. 1a shows a diagrammatic drawing of a top view of a first embodiment of a machine-tool frame for machining a crankshaft capable of using the method according to the invention with a first embodiment of the tool in the rest position, FIG. 1b shows a drawing of the machine-tool shown in FIG. 1a with the tool in contact with a reference point on the machine-tool, FIG. 2a shows a diagrammatic drawing of a top view of a second embodiment of a machine-tool frame for machining a crankshaft capable of using the method according to the invention with a second embodiment of the tool in the rest position, FIG. 2b shows a drawing of the machine-tool shown in FIG. 2a with the tool in contact with a reference point on the machine-tool, FIG. 2d shows a diagrammatic drawing of a third embodiment of a tool holder disk according to the invention.

DESCRIPTION OF PREFERRED EMBODIMENTS

Figure 1C:
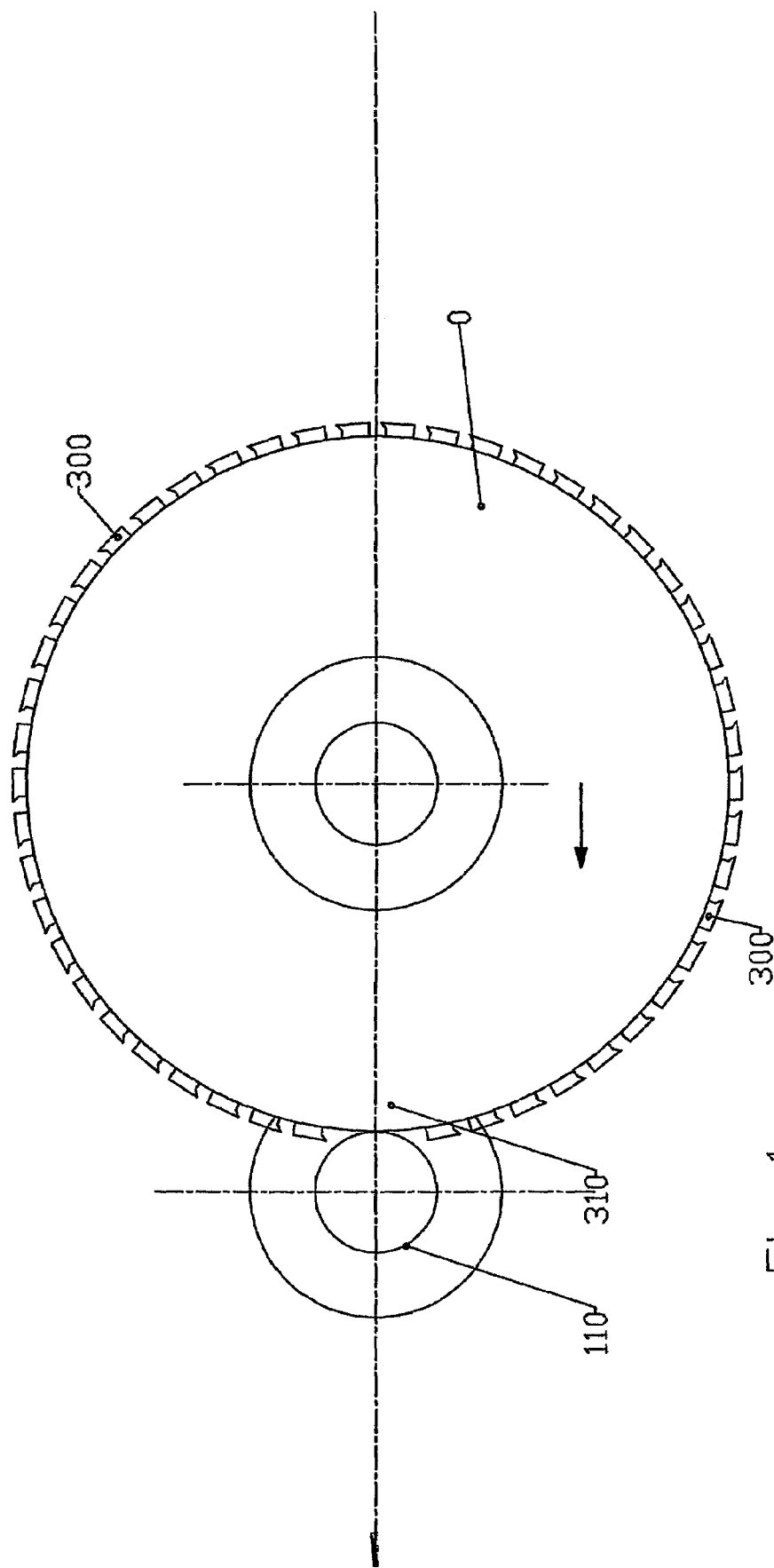
FIG. 1c shows a diagrammatic drawing of a side view of the machine-tool in the position shown in FIG. 1b.

As shown on the drawing in FIGS. 1a, 1b, 1c, 2a, 2b, 2c, 3a and 3b, the machine-tool reference M as a whole comprises a machining station composed of a station controlling the movement of the part to be machined that in this case is a crankshaft reference V facing a machining station controlling the movement of a tool or tool holder disk O.

The station controlling movement of the crankshaft V is composed particularly of two chucks 110 and 120 rotating the crankshaft V with respect to the fixed frame of the machine-tool M. The tool O is moved by a subassembly 200 rotating it and controlling its alternating straight line movements parallel to the axis of the crankshaft V as shown by the double arrow F1 and perpendicular to the axis of the crankshaft V as shown by the double arrow F2.

Figure 2C:
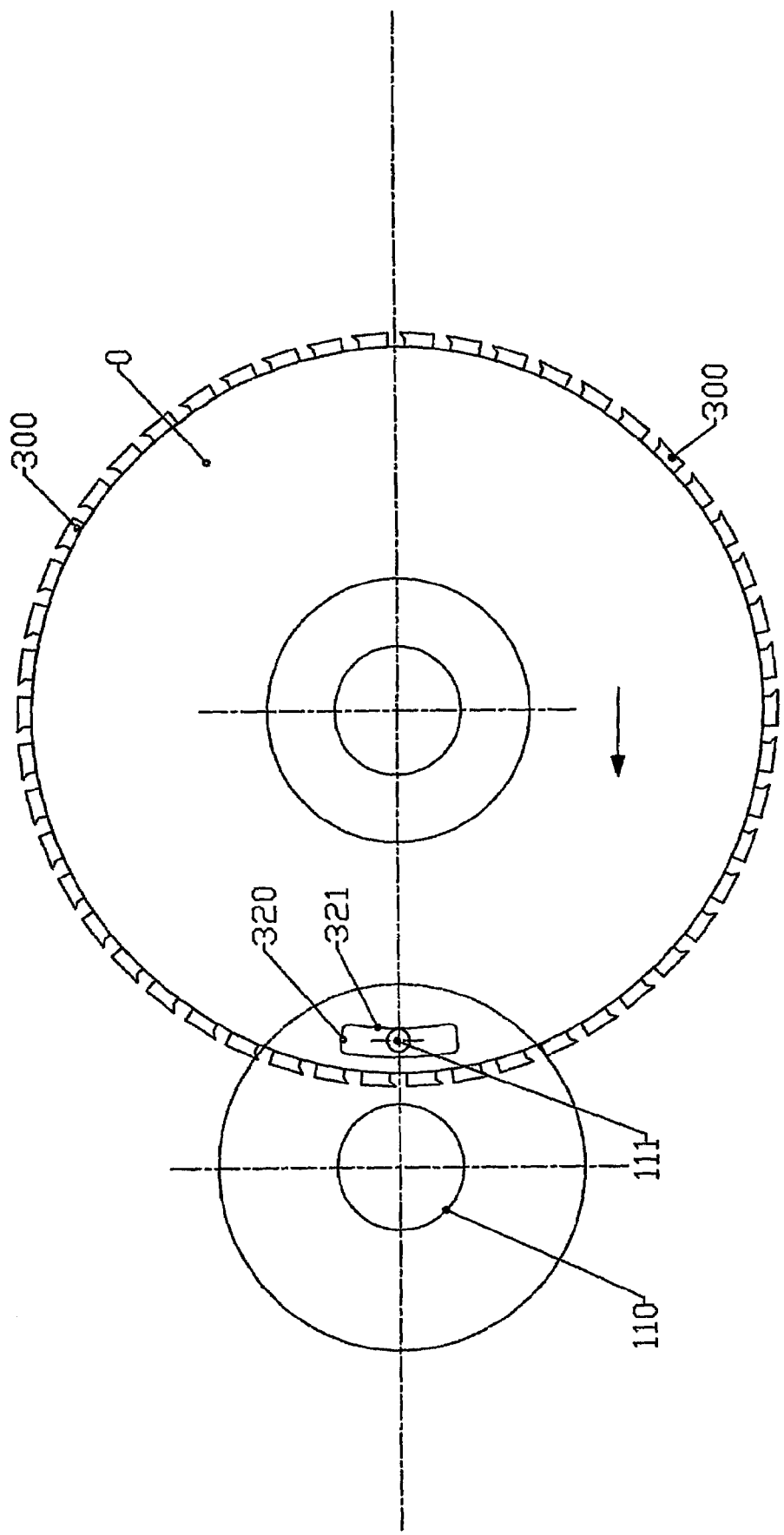
FIG. 2c shows a diagrammatic drawing of a side view of the machine-tool in the position shown in FIG. 2b.
Figure 3B:
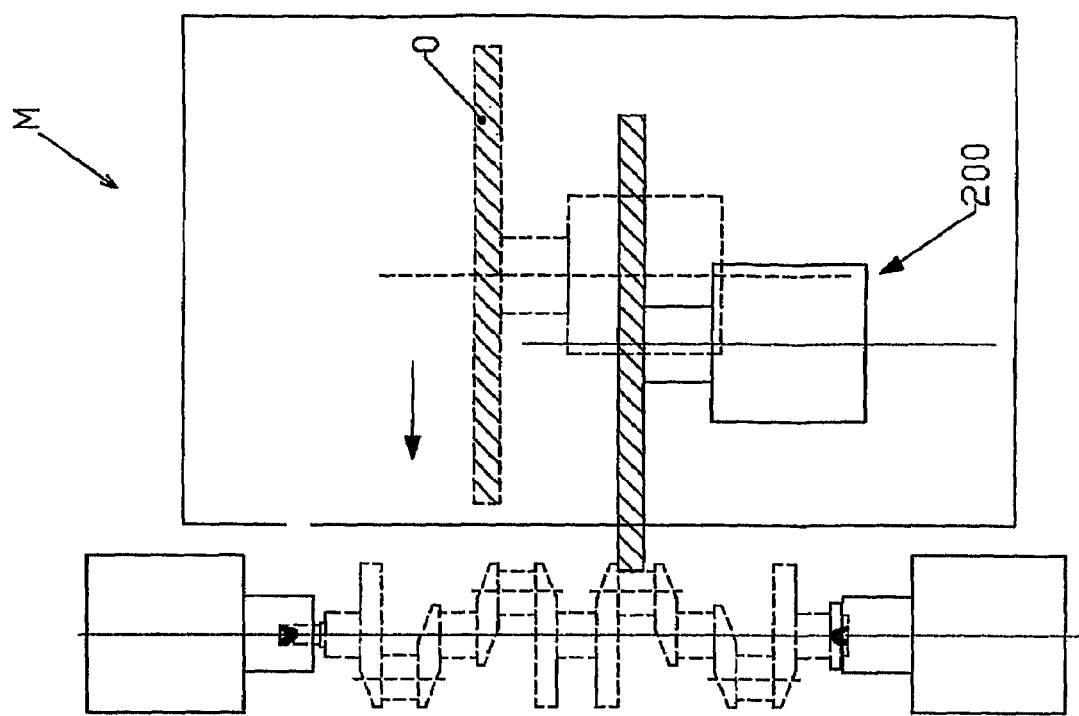
FIG. 3b shows a drawing of the machine-tool shown in FIG. 3a with the tool in contact with the part to be machined installed on the machine-tool.

As shown on the drawing in FIGS. 1b, 2b, 3b, the machine-tool M comprises a frame and applies at least one plunge feed movement of the tool O towards the part V.

According to the invention, the method is remarkable in that, as shown on the drawing in FIGS. 1b, 1c, 2b and 2c, it consists of stopping rotation of the tool O and moving the tool along a plunge feed movement towards a fixed point on the machining station of the machines tool M, chosen as a reference until it comes into contact. In fact, it is unimportant if the position of the reference point with respect to the position of the tool is known precisely, provided that all contacts are made on the same point. According to the embodiment shown on the drawing in FIGS. 1b and 1c, this fixed point is located on the station controlling movement of the part and is composed of the external surface of the chuck 110 holding the crankshaft V in position. Obviously, the measurement is taken when the rotation or the working movement of the tool O and the chuck 110 are stopped.

According to the invention, the tool O stopped in rotation is moved by the same straight line movement means as the means used during machining. Thus, as soon as the force applied by the plunge feed motor reaches a certain value used as a threshold because the tool O stops in contact with the point chosen as a reference, during its plunge feed movement shown by the arrow F2 towards the crankshaft V, a measurement is made using the measurement rule conventionally associated with the said plunge feed motor.

The use of an integrated function for a different purpose as proposed by this embodiment makes it possible to consider use of the method according to the invention with no additional hardware configuration, which makes it a particularly efficient solution for optimising production costs.

According to the invention, the machining method is remarkable in that it consists of making a measurement before the beginning of a machining phase in order to obtain a reference measurement for the stroke of the tool or the tool holder disk when the functional subassemblies are cold, for comparison with subsequent measurements and for making possible corrections to the corresponding strokes.

Thus, depending on the expansion of the tool O and its actuating means, the time at which the measurement is started and the physical magnitude obtained will be different and by comparison with the reference measurement, it will be possible to take account of dimensional differences and to correct the tool stroke accordingly. Thus, if the threshold is reached before the reference moment, the tool movement will be reduced by a value so that the said expansion can be corrected. With the machining method according to the invention integrating these measurement phases, the expansion phenomenon can be quantified and corrected at any time and particularly during transient phases that in prior art were the source of variables that could not be efficiently quantified.

The rotation movement reduction subassembly 210 of the tool holder disk O is one of the elements most affected by the expansion phenomenon, and is included in the measured dimension chain since this subassembly is dynamically dependent on the movement applied by the plunge feed motor.

According to the invention, the measurement method of the type using at least one tool holder disk on the periphery of which cutting inserts are arranged is remarkable in that it consists of orienting the tool O to stop in contact with the same angular area of the tool holder disk.

According to one characteristic shown on the drawing in FIG. 1c, contact is made between the reference point and the tool or the tool holder disk O on an angular area of the tool or tool holder disk O in which there are no inserts. This characteristic avoids repetitive contact on the inserts themselves, while including most of the tool holder disk within the measured dimension chain, thus helping to extend the life of the inserts.

In one preferred embodiment, the applicant has imagined a tool particularly adapted to this method. According to the invention, this tool holder disk O is remarkable in that it is preformed to hold cutting inserts 300 around its periphery except in at least one area 310 that is sufficiently large so that it can come into contact with a fixed bearing point with a known position in the machining station, after the tool is in its angular orientation.

The reference stop may be any point that the tool O can reach, under the control of its working actuating means, and for which the position is not affected or is less affected by the expansion phenomenon FIGS. 2a, 2b, 2c and 2d show a different embodiment in that the reference point on which the tool O comes into contact is materialised by a stop 111. Although this stop can obviously act as a bearing point at the periphery of the tool holder disk, the embodiment shown proposes a tool O that is remarkable in that a slot 320 is formed in it, and one of the faces 321 of the slot comes into contact with a point provided for this purpose on the machine-tool M in its machining station, in other words the stop 111, after the tool is in its angular orientation As shown on the drawings in FIGS. 2a, 2b and 2c, the movement control subassembly 200 implements several movements to engage the stop 111 that projects from a fixed part of the chuck 110.

According to one preferred but non-limitative embodiment shown by the drawing in FIG. 2d, the tool holder disk O is remarkable in that an oblong hole 330 is formed in it that holds a removable wear part 331 designed to come into contact with the stop 111. As for the slot 320, the oblong hole 330 is not necessarily a through hole, the actuating means of the tool O providing sufficient precision to place the tool such that the end of the stop 111 comes in the oblong hole 330 and the actuating means of the tool O controlling movement along the plunge feed axis brings the wear part 331 into contact with the said stop 111. Consequently, a cross-sectional view of the stop 111 is shown in FIG. 2d to illustrate the contact. Since it is not a through hole, the oblong hole 330 provides a positioning and attachment surface for the wear part 331.

This technological solution has the advantage that it avoids the need to have part of the periphery of the tool holder disk O without any cutting parts, which would be impossible in the case of a milling disk. It also avoids excessive removal of material at the disk or deterioration of the bearing surface of the slot 320. In fact, by definition, We wear part can be replaced as soon as there are any signs of wear on it.

According to one particularly advantageous characteristic, the surface 332 of the wear part 331 designed to come into contact with the stop has a circular profile in which the radius passes through the rotation axis of the tool O. The contact surface of the stop 111 itself is circular, therefore contact between the two surfaces, in other words firstly the cylindrical surface of the stop 111 and secondly the cylindrical surface 332 of the wear part 331, guarantees optimum contact.

As shown on the drawings in FIGS. 1c, 2c and 2d, the surfaces coming into contact with the point selected as the reference point in the machining station, when they are not formed by the cutting parts themselves, as located as close as possible to the cutting parts so that the expansion phenomenon is taken into account as much as possible in the dimension chain that starts at the actuating means and ends at the cutting parts of the tool.

FIGS. 3a, 3b, 4a and 4b show the use of the measuring method on the part according to the invention. Thus, as shown, the contact between the tool O and the part V is made so as to take a direct measurement on the part V to implement the method according to the invention consisting of making the tool or the tool holder disk O, when stopped, come into contact with the part V to be machined, so as to find out the value of the stroke performed and in repeating the operation to compare recorded values and to correct the strokes and orientations during the machining process itself to be done.

Figure 3A:
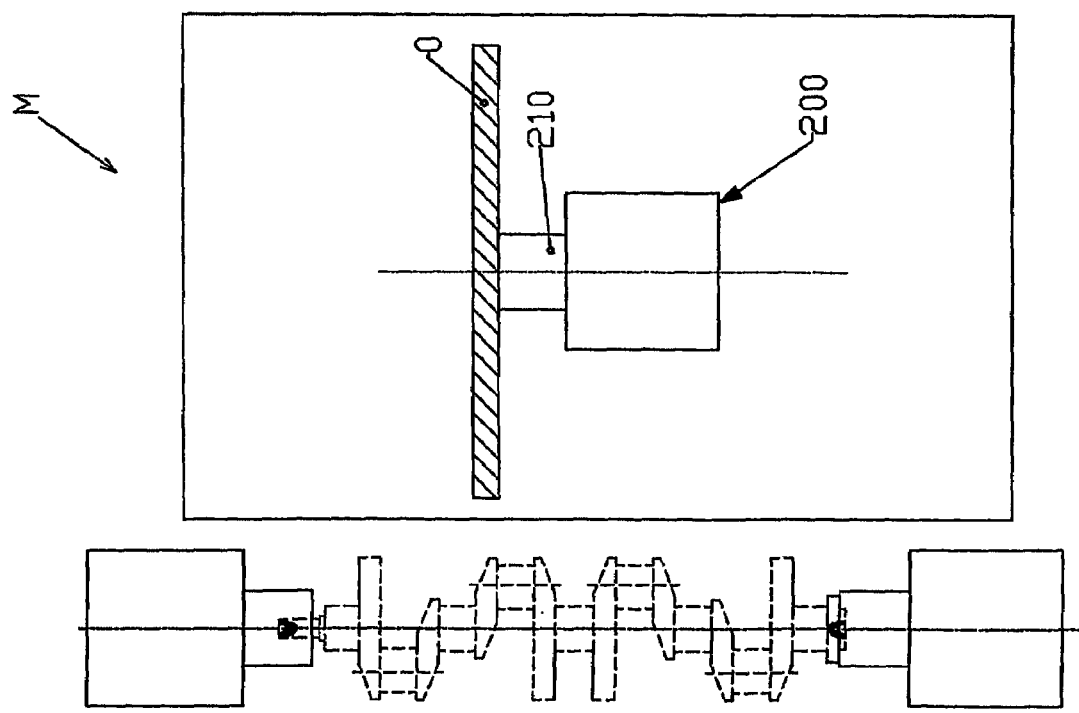
FIG. 3a shows a diagrammatic drawing of a top view of any embodiment of a machine-tool frame for machining a crankshaft capable of using the method according to the invention with any embodiment of the tool in the rest position.
Figure 4B:
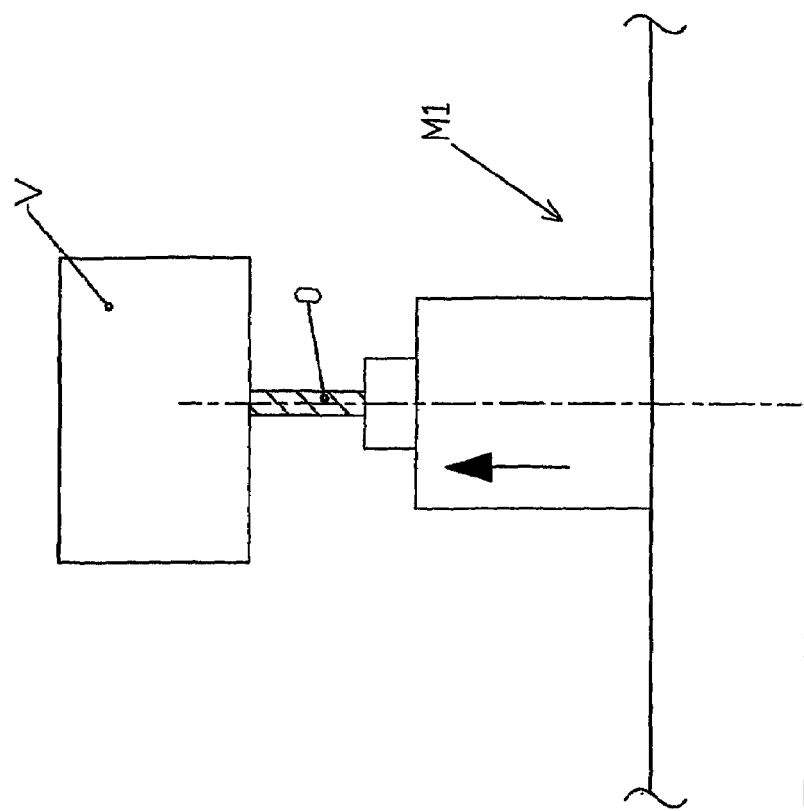
FIG. 4b shows a drawing of the machine-tool shown in FIG. 4a with the tool in contact with the part to be machined installed on the machine-tool.
Figure 4A:
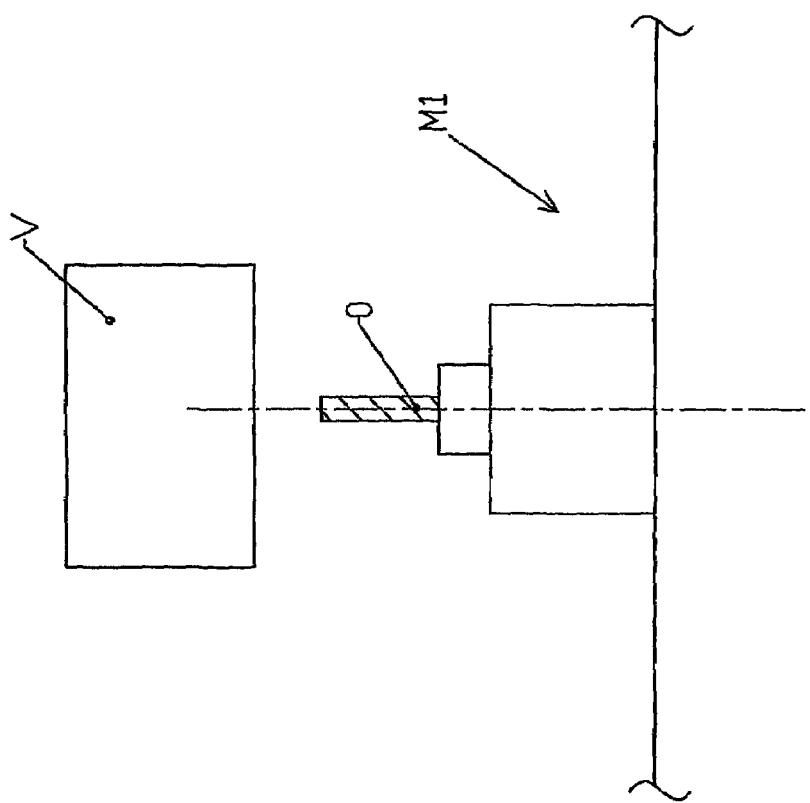
FIG. 4a shows a diagrammatic drawing of a top view of any embodiment of a machine-tool frame for machining comprising a tool holder slide capable of using the method according to the invention with any embodiment of the tool in the rest position.

FIGS. 3a and 3b show an implementation of the method according to the invention using a machine-tool M similar to that shown in FIGS. 1a, 1b, 1c, 2a, 2b, 2c that is used to machine a crankshaft V using a tool holder disk O. FIGS. 4a and 4b show a machine-tool M1 comprising a tool holder slide moving the machine-tool.

For example, two measurements made using the method according to the invention can be compared to correct the orientation of a part before machining.

The invention has been described in the context of a disclosure rather than a limitation. Obviously, various arrangements and modifications could be made to it without going outside the scope of the invention as defined by the claims.

What is claimed is:

1. A measuring method applicable to a machine-tool (M) comprising a machining station in which at least one tool or tool holder disk (O) is moved relative to at least one part to be machined (V), the relative displacement of the tool (O) with respect to the part (V) being controlled by at least one actuating means (200) for which the position and stroke are controlled and known, the actuating means (200) being fitted with a means of detection of the force produced by the said actuating means (200), wherein said method comprises:

making the tool or the tool holder disk (O) come into contact with a point chosen as a reference in the machining station by controlling the said actuating means (200) which, through exceeding a force value previously defined as a threshold, triggers the measurement so as to find out the value of the stroke performed, repeating the operation to compare the recorded values, and correcting the strokes during the required machining process itself.

2. A method according to claim 1, further comprising:

making the tool or the tool holder disk (O), when stopped, come into contact with a point chosen as a reference in the machine-tool (M) by controlling the said actuating means so as to find out the value of the stroke performed and repeating the operation to compare the recorded values and to correct the strokes during the required machining process itself.

3. A method according to claim 1, further comprising:

making the tool or the tool holder disk (O), when stopped, come into contact with the part (V) to be machined so as to find out the value of the stroke performed, and repeating the operation to compare the recorded values and to correct the strokes and orientations during the machining process to be carried out itself.

4. A method according to claim 1, adapted to a machine-tool (M in which the actuating means (200) of the tool or the tool holder disk (O) towards the part (V) is fitted with a means of detecting the force produced, farther comprising:
setting up a force trigger threshold for the means controlling the plunge feed movement of the tool or the tool-holder disk (O) towards the part (V), during the measuring phase, such that the feed plunge movement is stopped and the stroke is measured as soon as the force threshold has been exceeded.

5. A method according to claim 1, comprising
making a measurement before the beginning of a machining phase so as to obtain a reference measurement for the stroke of the tool or tool holder disk (O) when the functional subassemblies are cold so that a comparison can be made with subsequent measurements and any necessary corrections to the corresponding strokes can be made.

6. A machining method according to claim 1 of the type using at least one tool holder disk (O) on the periphery of which cutting inserts (300) are arranged, said method comprising orienting the tool holder disk (O) to stop in contact with the same angular area of the tool holder disk (O).

7. A machining method according to claim 6, wherein contact is made between the reference point and the tool or the tool holder disk (O) on an angular area (310) of the tool or tool holder disk (O) in which there are no inserts (300).

8. A tool holder disk (O) used to implement the method according to claim 6, wherein it is preformed to hold cuffing inserts (300) around its periphery except in at least one area that is sufficiently large so that it can come into contact with a fixed bearing point with a known position in the machining station, after being oriented at the right angle.

9. A tool holder disk (O) used to implement the method according to claim 6, wherein a slot (320) is formed in it, and one of the faces (321) of the slot comes into contact with a point provided for this purpose on the machine-tool (M) after the tool is in its angular orientation.

10. A tool holder disk (O) used to implement the method according to claim 6, wherein an oblong hole (330) is formed in it that holds a removable wear part (331) designed to come into contact with the stop (111).

11. A software product for managing the measuring method according to claim 1, wherein said software product consists of memorizing measurements made at the beginning of the method and triggered by the actuating means, to make comparisons between subsequent measurements and memorized measurements, and consequently to correct the strokes and orientations of parts (V) or tools (O).

* * * * *